Patented Sept. 10, 1940

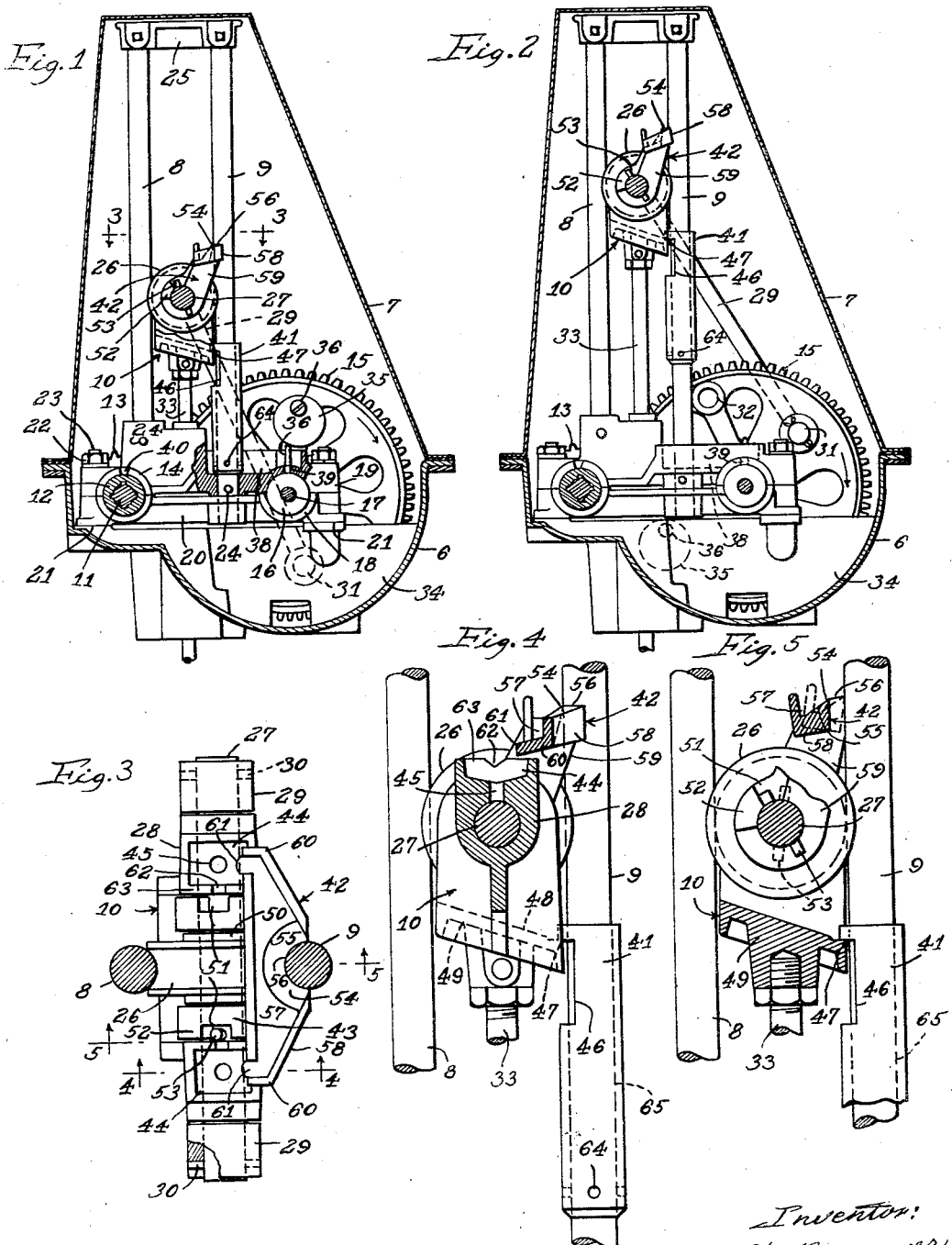

2,214,570

UNITED STATES PATENT OFFICE 2,214,570

WINDMILL

Louis W. Bangasser, Freeport, Ill., assignor to Stover Manufacturing & Engine Co., Freeport, Ill., a corporation of Illinois Application November 5, 1938, Serial No. 238,993

18 Claims. (Cl. 184—4)

This invention relates to windmills, and has for its primary object the provision of improved means for lubricating the cross-head guides and cross-pin bearings.

The lubrication of the pump gearing usually has presented no problem, because the large driven gears rotating in the sump pick up an adequate supply of oil to lubricate the driven pinions meshing with these gears, and dippers on the driven gears pick up sufficient oil to supply the trough from which one or more of the main bearings are lubricated. However, the lubrication of the cross-head guides and cross-pin bearings has always been a problem. Force pumps have been used but have not been entirely satisfactory, because, while they furnish more than enough lubricant when functioning properly, there is always the danger of the oil pump not being primed when the mill is installed, and the danger of check valves failing or pump plungers sticking or clogging. It is therefore the principal object of my invention to provide lubricating means of a different type which does not involve the use of any actual oil pump or check valves of any kind and in which there is only one oiling plunger that is positively moved with the cross-head upon each reciprocation thereof, so that it cannot fail to deliver oil whenever the mill is operating.

According to my invention, the oiling plunger is reciprocated with the cross-head on one of the cross-head guides, and in dipping into a trough that is continuously supplied with oil from the dippers on the driven gears, picks up sufficient oil to coat the related cross-head guide with a film of oil, and a scraper oscillatably mounted on the cross-head and allowed to ride lightly in engagment with the cross-head guide only on the upstrokes is adapted to scrape off this film of oil, so as to supply oil continuously to the cross-pin bearings on the cross-head and incidentally lubricate the oscillating bearing mounting for the scraper itself, as well as the guide roller's bearing on the cross-pin.

The invention is illustrated in the accompanying drawing, in which—

Fig. 1 is a vertical cross-section through the head of a windmill embodying my invention, illustrating the cross-head oiling mechanism at the commencement of the upstroke;

Fig. 2 is a view similar to Fig. 1, showing the mechanism on the downstroke;

Fig. 3 is a horizontal section on the line 3—3 of Fig. 1, on a larger scale, illustrating the relationship of the scraper to the cross-pin bearings and the rest of the cross-head assembly;

Fig. 4 is a sectional detail on the line 4—4 of Fig. 3, and

Fig. 5 is a section on the broken line 5—5 of Fig. 3, but showing the scraper in the position illustrated in Fig. 2.

The same reference numerals are applied to corresponding parts throughout the views.

The windmill in connection with which I have illustrated my invention is constructed along the lines disclosed in the copending application of Henry N. Edens and Clarence B. Molter, Serial No. 238,992, filed Nov. 5, 1938, but may, of course, be used in connection with any other windmill construction where a cross-head and guides constructed and lubricated in the manner herein disclosed would be suitable.

The reference numeral 6 designates the mill head and 7 the sheet metal hood provided thereon to enclose the cross-head guides 8 and 9 between which the cross-head 10 operates. As disclosed in the Edens and Molter application aforesaid, the wheel shaft 11 driven by the wind wheel has a spline connection with the journal 12 of the driven pinions 13 of which there are two on opposite sides of the bearing 14, the sections, Figs. 1 and 2, being taken in a plane in front of one of these pinions. There are likewise two driven gears 15 meshing with the pinions, although only one appears in the drawing. The journals 16 of the two gears 15 are fastened together by a through bolt indicated at 17, and are received in the bearing 18. The bearings 14 and 18 in accordance with the above-mentioned application are provided in upper and lower bearing halves 19 and 20 demountably secured on seats 21 provided therefor in the head 6 and are removable when the nuts 22 are removed from the studs 23 that project upwardly from the seats 21. The guide rods 8 and 9 are carried on the upper bearing half 19, being fastened thereto by pins 24, as shown. The guide rods are connected together at their upper ends by a cross-bracket 25. A sheave-like roller 26 fits between the guide rods 8 and 9 and is adapted to roll on the rod 8 on the upstrokes and on the rod 9 on the downstrokes of the cross-head 10. It is carried on a cross-pin 27 received in laterally spaced bearings 28 provided therefor on the cross-head. Pitman rods 29 secured by pins 30 to the opposite ends of the cross-pin 27 provide operating connections between the cross-head 10 and the driven gears 15 in the usual way. Two crank pins 31 and 32 are provided on each of the driven gears 15 on the same two radii, like the ones shown in Fig. 2, whereby to provide a shorter pumping stroke when the pitmans are connected with the crank pins 31 and a longer stroke when the crank pins 32 are used. 33 is the plunger rod connected with the cross-head 10 and adapted to transmit reciprocatory movement to the sucker rod in the usual way.

In the operation of the mill, the gears 15 are driven in a clockwise direction, as indicated by the arrows, thereby reciprocating the cross-head 10 up and down between the guide rods 8 and 9 and accordingly reciprocating the sucker rod connected with the plunger rod 33. In the rotation of the gears 15, oil is picked up from the sump 34 so as to lubricate the drive pinions 13 meshing with the driven gears. Dippers 35 which are in the form of disks loosely supported on the inner sides of the gears 15 adjacent the bearings 19—20 are adapted to pick up oil which, when these dippers are dragged over wipers 37 in the manner illustrated and described in Chronic and Molter Patent 2,046,059, will result in the depositing of so much oil per revolution of the gears which collects in the trough 38 provided on top of the upper bearing half 19. An oil hole 39 delivers oil from the trough to one of the main bearings 18, whereas the other main bearing 14 is lubricated through slots 40 in the opposite sides thereof by oil running down the sides of the pinions 13. No invention is claimed herein to any of the details of the structure thus far described, excepting only in so far as they contribute toward or form parts of the novel combinations hereinafter described and pertain to the lubrication of the cross-head 10 and guide rods 8 and 9.

In accordance with my invention, an oiler plunger 41 which is in the form of a sleeve fitting loosely on the guide rod 9 is adapted to be reciprocated on the rod by the cross-head 10 to dip into the oil in the trough 38 on each downstroke, so as to pick up oil with it to coat the guide rod on the upstrokes, and a scraper 42 carried on the cross-pin 27 on a pair of laterally spaced bearings 43 is adapted to oscillate with respect to the cross-pin and come into scraping contact with the side of the guide rod 9 only on the upstrokes of the cross-head, so as to scrape off a small amount of oil on each upstroke and deliver it into wells 44 from which the cross-pin bearings 28 are supplied with oil through holes 45. The plunger 41 has an elongated cutaway portion 46 on one side arranged to receive a projection 47 provided therefor on the lower end of the cross-head 10, providing a lost-motion operating connection between the plunger and cross-head so as to allow the cross-head 10 to come down farther than is indicated in Fig. 1, as, for example, when the crank pins 32 are used. In other words, with this lost-motion connection the plunger 41 comes to rest in the trough 38 on each downstroke and there may or may not be additional downward movement of the cross-head 10, depending upon whether the windmill is set for a long or short stroke of the plunger rod 33. It will be noticed that the cross-head 10 is forked, providing one of the cross-pin bearings 28 on each of the two arms thereof and that the top surface 48 of the middle portion 49 to which the plunger rod 33 connects is under the roller 26 and is inclined toward the projection 47 so as to drain surplus oil gathering on the cross-head back into the plunger 41 through the cut-out portion 46 and thus insure its being returned to the trough 38 or being used by the plunger 41 in coating the guide rod 9. The roller 26 by its rolling contact with the rod 9 transfers oil to the guide rod 8 and in its rotation will drop excess oil onto the inclined surface 48. This lubrication of the guide rods and roller makes for smooth and easy operation and minimizes wear, particularly since there is rolling contact between the parts in contrast to sliding contact. A certain amount of the oil running down the sides of the roller finds its way onto the cross-shaft and into the bearing hub 50 of the roller to keep it well lubricated. The roller and guide rods should therefore last as long as any other working parts of the mill. The oil scraper 42 has its bearings 43 cut away, as at 51, on the outer sides thereof, leaving projections 52 against one of which a radial-pin 53 carried on the pin 27 is arranged to engage to swing the scraper 42 in a counterclockwise direction through a small angle away from the guide rod 9 during each downstroke of the cross-head, whereby to hold the scraper portion 54 out of contact with the guide rod throughout the downstroke, as illustrated in Fig. 2. The scraper portion 54 is in the form of a half collar having a downwardly sloping top surface 55 terminating in a sharply defined semi-circular scraping edge 56 at the upper end and serving to drain oil from said edge into a trough 57 formed in the cross-portion 58 of the scraper 42. The bearings 43, previously referred to, are provided on the ends of downwardly reaching arms 59 provided on the scraper near the opposite ends of the cross-portion 58. The projecting ends 60 of the latter have spouts 61 for discharging oil from the ends of the trough 57 into the oil wells 44 in the tops of the cross-pin bearings 28 on the cross-head 10. It is only during the upstrokes that the scraping edge 56 comes into contact with the guide rod 9, as indicated in Fig. 1, because the pin 53 is oscillated with the cross-pin 27 by means of the pitman rods 29, and during each upstroke moves away from the lug 52, thus allowing the scraper 42, which is unbalanced because of the location of the cross-portion 58 on one side of center, will immediately come to rest against the guide rod 9 for support. The scraper engages the guide rod lightly but positively enough to insure the scraping off of some oil on each upstroke, the oil being that deposited by the plunger 41. It is apparent here that since the scraping edge 56 is in advance of the roller 26 on the upstrokes, the major portion of the film of oil will be removed by the scraper and collected in the trough 57, and the roller 26 will pick up some of what remains. There is always more oil supplied to the wells 44 than is needed for lubrication of the cross-pin bearings 28, and the surplus overflows through grooves 62 provided in the tops of the inner side walls 63 of the wells 44 in vertical alignment with the cut-out portions 51 on the bearings 43 of the oil scraper 42 which are disposed alongside the cross-pin bearings, as clearly appears in Fig. 3. In that way, the overflow oil finds its way directly into the bearings 43 to furnish adequate lubrication therefor. Very little lubrication is necessary there, because of the small angle through which the scraper 42 oscillates in each reciprocation of the cross-head, but, of course, whatever surplus drains off from these parts is collected on the inclined surface 48 and drains back into the plunger 41 and is either returned to the oil supply trough 38 or spread on the guide rod 9 by the plunger.

It should be clear from the foregoing description that the oiling means herein disclosed is much more positive in its operation and less apt to fail under adverse service conditions, because there are no check valves that might stick or get clogged and no pump plunger that is apt to fail to operate properly by reason of sticking or clogging or because of no priming. The plunger 41 is positively reciprocated with the cross-head and is found to deposit a film of oil on the guide rod satisfactorily without ever requiring attention. The loose fit of the plunger may be sufficient for the present purposes, but I have found that, if more oil is wanted, that is easily supplied by drilling two or four or more holes 64 radially through the wall of the plunger at or near the lower end thereof. The mere fact that the bore 65 of the plunger 41 will in time show some slight wear is considered advantageous for the present purposes, because it will make it that much easier for oil to find its way up into the plunger each time the same dips into the oil in the trough 38. There is always a thick enough film for the scraper 42 to gather enough oil for the adequate lubrication of the cross-pin bearings 23 and scraper bearings 43. In conclusion, I would add that whereas many windmills have relied upon dippers for lifting oil from a reservoir into a trough for the primary lubrication system that is for the lubrication of one or more of the main bearings, they have invariably involved complicated force pumps in the auxiliary lubricating system from which the cross-head is lubricated, and such pumps have not been reliable. With my invention, both the primary and the auxiliary lubricating systems include dipping elements, and hence the lubrication is more positive.

It is believed the foregoing description conveys a good understanding of the objects and advantages of my invention. The appended claims have been drawn with a view to covering all legitimate modifications and adaptations.

I claim:

1. In a windmill, the combination of a mill head adapted to contain oil for lubrication of working parts therein, a pair of substantially vertical guides, a cross-head having a roller disposed between and adapted to roll on said guides, a plunger rod reciprocated by the cross-head, mechanism operated by the wind wheel and connected with the cross-head for reciprocating the same, an oiling plunger slidable on one of said guides and reciprocated with the cross-head so as to dip into the oil in the mill head and coat the guide therewith, said roller being arranged in its reciprocation and rolling contact with the guides to transfer some oil from the oiled guide to the other guide, and a scraper oscillatably mounted on the cross-head and arranged to be oscillated in timed relation with the reciprocation of the cross-head by the mechanism reciprocating the latter so as to engage one of said guides only when the cross-head is moving in one direction, said scraper delivering oil to the cross-head for lubrication thereof.

2. A windmill as set forth in claim 1, wherein the oiling plunger has a cut-out portion receiving a projection on the cross-head to provide an operating connection therebetween, and wherein the cross-head has an inclined surface provided thereon under the roller inclined toward the top of the projection, substantially as and for the purpose described.

3. In a windmill, the combination of a mill head adapted to contain oil for lubrication of working parts therein, a pair of substantially vertical guides, a forked cross-head adapted to be connected to a pump plunger rod and providing upwardly extending laterally spaced cross-pin bearings, a roller disposed between said bearings on a cross-pin received therein, the roller being disposed between and adapted to roll on the guides, mechanism operated by the wind wheel and connected to opposite ends of the cross-pin for reciprocating the cross-head, an oiling plunger telescoping on one of said guides and reciprocable with the cross-head, said plunger being arranged to dip into the oil in said mill head so as to coat the guide with oil, a forked member providing laterally spaced bearings received on the cross-pin on opposite sides of the roller and providing a cross-portion adapted to slide on one of said guides so as to scrape oil therefrom to lubricate the cross-pin bearings, and means for holding said forked member out of engagement with the guide when the cross-head is moving in one direction.

4. In a windmill, the combination of a mill head adapted to contain oil for lubrication of working parts therein, a pair of substantially vertical guides, a forked cross-head adapted to be connected to a pump plunger rod and providing upwardly extending laterally spaced cross-pin bearings, a roller disposed between said bearings on a cross-pin received therein, the roller being disposed between and adapted to roll on the guides, mechanism operated by the wind wheel and connected to opposite ends of the cross-pin for reciprocating the cross-head, an oiling plunger telescoping on one of said guides and reciprocable with the cross-head, said plunger being arranged to dip into the oil in said mill head so as to coat the guide with oil, a forked member providing laterally spaced bearings received on the cross-pin on opposite sides of the roller and providing a cross-portion adapted to slide on one of said guides so as to scrape oil therefrom to lubricate the cross-pin bearings, a trough on the cross-portion for receiving oil scraped off the guide, said trough having discharge ends in vertical alignment with and over the cross-pin bearings, said cross-pin bearings having oil receiving wells on the tops thereof communicating with the bearings and adapted to receive oil from the discharge ends of said trough, and means for holding said forked member out of engagement with the guide when the cross-head is moving in one direction.

5. A windmill as set forth in claim 13, wherein the wells on the tops of the cross-pin bearings have overflow outlets in vertical alignment with and over the bearings of the forked member for discharging oil to said bearings to lubricate the same.

6. A windmill as set forth in claim 13, wherein the wells on the tops of the cross-pin bearings have overflow outlets in vertical alignment with and over the bearings of the forked member for discharging oil to said bearings to lubricate the same, the latter having oil receiving and conducting channels provided in the adjacent side portions thereof for conducting oil to the cross-pin to insure entry into said bearings.

7. A windmill as set forth in claim 13, wherein the wells on the tops of the cross-pin bearings have overflow outlets in vertical alignment with and over the bearings of the forked member for discharging oil to said bearings to lubricate the same, the latter having oil receiving and conducting channels provided in the adjacent side portions thereof for conducting oil to the cross-pin to insure entry into said bearings, the means for holding the forked member out of engagement with the oiled guide comprising a pin extending radially from the cross-pin in one of said channels and adapted to engage one side of the channel upon oscillation of the cross-pin so as to oscillate the forked member with the cross-pin.

8. A windmill as set forth in claim 4, wherein the oiling plunger has a cut-out portion receiving a projection on the cross-head to provide an operating connection therebetween, and wherein the cross-head has an inclined surface provided thereon under the roller and the bearings for the forked member inclined toward the top of the projection substantially as and for the purpose described.

9. In a windmill, the combination of a mill head adapted to contain oil for lubrication of working parts therein, pump gearing in said head, a cross-head reciprocable vertically relative to said head and mounted on the upper end of a pump plunger rod, a pitman rod connection between the pump gearing and the cross-head for reciprocation of the latter, and means for lubricating the cross-head at the pitman rod connection, said means comprising a rod extending substantially vertically from the mill head alongside the path of movement of the cross-head, an oiling plunger having a sliding telescoping fit on the rod and reciprocable with the cross-head and adapted to dip into the oil in the mill head so as to coat the rod with a film of oil, and an oscillating wiper oscillatably mounted with respect to the cross-head and having means for oscillating the same in timed relation to the oscillation of the pitman rod relative to the cross-head, so as to slidably engage the rod when the cross-head moves in one direction, said wiper also having means for conducting oil removed from the rod to the cross-head to lubricate the same at the pitman rod connection.

10. In a windmill, the combination of a mill head adapted to contain oil for lubrication of working parts therein, a pair of substantially vertical guides, a cross-head disposed between and adapted to work on said guides, a plunger rod reciprocated by the cross-head, mechanism operated by the wind wheel and connected with the cross-head for reciprocating the same, means for supplying oil to one of said guides, and a scraper oscillatably mounted on the crosshead and arranged to be oscillated in timed relation with the reciprocation of the cross-head by the mechanism reciprocating the latter so as to engage one of said guides only when the cross-head is moving in one direction, said scraper delivering oil to the cross-head for lubrication thereof.

11. A windmill as set forth in claim 10 wherein the means for supplying oil to the guide comprises an oiling plunger slidable on the guide, the same having a cut out portion receiving a projection on the cross-head to provide an operating connection therebetween, and wherein the cross-head has an inclined top surface provided thereon, inclined toward the top of the projection substantially as and for the purpose described.

12. In a windmill, the combination of a mill head adapted to contain oil for lubrication of working parts therein, a pair of substantially vertical guides, a cross-head working on said guides and adapted to be connected to a pump plunger rod and providing cross-pin bearings, a cross-pin received therein, mechanism operated by the wind wheel and connected to opposite ends of the cross-pin for reciprocating the cross-head, means for supplying oil to one of said guides, a forked member providing laterally spaced bearings received on the cross-pin on opposite sides of the cross-head and providing a cross-portion adapted to slide on one of the guides so as to scrape oil therefrom to lubricate the cross-pin bearings, and means for holding said forked member out of engagement with the guide when the cross-head is moving in one direction.

13. In a windmill, the combination of a mill head adapted to contain oil for lubrication of working parts therein, a pair of substantially vertical guides, a cross-head working on said guides and adapted to be connected to a pump plunger rod and providing cross-pin bearings, a cross-pin received therein, mechanism operated by the wind wheel and connected to opposite ends of the cross-pin for reciprocating the cross-head, means for supplying oil to one of said guides, a forked member providing laterally spaced bearings received on the cross-pin on opposite sides of the cross-head and providing a cross-portion adapted to slide on one of the guides so as to scrape oil therefrom to lubricate the cross-pin bearings, a trough on the cross-portion for receiving oil scraped off the guide, said trough having discharge end portions in vertical alignment with and over the cross-pin bearings, said cross-pin bearings having oil receiving wells on the top thereof communicating with the bearings and adapted to receive oil from the discharge end portions of said trough, and means for holding said forked member out of engagement with the guide when the cross-head is moving in one direction.

14. In a windmill, the combination of a mill head adapted to contain oil for lubrication of working parts therein, pump gearing in said head, a cross-head reciprocable vertically relative to said head and mounted on the upper end of a pump plunger rod, a pitman rod connection between the pump gearing and the cross-head for reciprocation of the latter, said connection including a cross-pin received in a bearing on the cross-head and having the pitman rod attached thereto, a vertical guide member for said cross-head, means for supplying oil to said guide, an oil scraper slidable on the guide to scrape oil therefrom in the movement of the cross-head in one direction to lubricate the cross-pin and its bearing on the cross-head, said scraper having a bearing portion pivoted on the cross-pin, the bearing portion having a cut-out portion and a substantially radial projection on said cross-pin extending into said cut-out portion and adapted to engage one side thereof in the oscillation of the cross-pin with the pitman rod so as to oscillate the scraper with the cross-pin and maintain the same in spaced relation to the guide when the cross-head is moving in the opposite direction.

15. A windmill construction comprising an oil reservoir, a cross-head, a vertical guide therefor, pump gearing operating in the oil reservoir, a pitman rod connecting said gearing with the cross-head to reciprocate the latter on the guide, and an oil scraper moving with the cross-head actuated by the pitman rod so as to move into and out of engagement with the guide in the reciprocation of the cross-head.

16. A windmill construction comprising an oil reservoir, a cross-head, a vertical guide therefor, pump gearing operating in the oil reservoir, a pitman rod connecting said gearing with the cross-head to reciprocate the latter on the guide, an oil scraper pivotally mounted on the cross-head so as to gravitate normally toward and engage the guide, and means oscillating with the pitman rod relative to the cross-head and arranged to move the scraper out of engagement with the guide throughout a portion of a reciprocation of the cross-head.

17. A windmill construction comprising a mill head containing oil for lubrication of working parts therein, pump gearing in the head, a vertical cross-head guide on said head, a cross-head operating thereon and connected with the pump gearing by means of a pitman rod, an oiler depending from the cross-head and reciprocating therewith on the guide and arranged to dip into oil in the head so as to coat the guide with oil on the up-strokes of the cross-head, and an oil scraper moving with the cross-head and actuated by the pitman rod so as to engage the guide only when the cross-head is moving in one direction.

18. In a windmill, a mill head adapted to contain lubricating oil, a reciprocable cross-head, an upright guide therefor on the mill head arranged to be coated with oil in the operation of the mill, mechanism operated by the wind wheel connected with said cross-head for operating the same, an oscillating oil scraper pivotally mounted relative to the cross-head, and means for oscillating the scraper in timed relation with the reciprocation of the cross-head so as to have scraping contact with the guide only when the cross-head moves in one direction.

LOUIS W. BANGASSER.